US006185663B1

(12) United States Patent
Burke

(10) Patent No.: US 6,185,663 B1
(45) Date of Patent: Feb. 6, 2001

(54) COMPUTER METHOD AND APPARATUS FOR FILE SYSTEM BLOCK ALLOCATION WITH MULTIPLE REDO

(75) Inventor: Robert Burke, Perth (GB)

(73) Assignee: Compaq Computer Corporation, Houston, TX (US)

( * ) Notice: Under 35 U.S.C. 154(b), the term of this patent shall be extended for 0 days.

(21) Appl. No.: 09/094,733

(22) Filed: Jun. 15, 1998

(51) Int. Cl.$^7$ ................................................... G06F 12/00
(52) U.S. Cl. .......................... 711/156; 711/161; 711/162; 711/147; 707/202
(58) Field of Search .................................. 711/147, 156, 711/162, 161; 707/1, 202, 205

(56) References Cited

U.S. PATENT DOCUMENTS

| | | | |
|---|---|---|---|
| 5,435,004 | * 7/1995 | Cox et al. ............................. | 707/205 |
| 5,455,946 | * 10/1995 | Mohan et al. ........................ | 707/202 |
| 5,675,767 | * 10/1997 | Baird et al. .......................... | 711/156 |
| 5,706,470 | * 1/1998 | Okada ................................... | 711/161 |
| 5,742,792 | * 4/1998 | Yanai et al. .......................... | 711/162 |
| 5,893,086 | * 4/1999 | Schmuck et al. ........................ | 707/1 |

OTHER PUBLICATIONS

Lomet, David B., "Recovery for Shared Disk Systems Using Multiple Redo Logs," (Report CRL 90/4) Digital Equipment Corporation, Oct. 1, 1990.

Thekkath, C.A., et al., "Frangipani: A Scalable Distributed File System," In Proceedings of the 16th ACM Symposium on Operating Systems Principles, pp. 224–237, ACM Press (Oct. 1977).

* cited by examiner

Primary Examiner—Do Hyun Yoo
Assistant Examiner—Nasser Moazzami
(74) Attorney, Agent, or Firm—Hamilton, Brook, Smith & Reynolds, P.C.

(57) ABSTRACT

A shared persistent memory (e.g., disk) file system provides persistent memory block allocation with multiple redo logging of memory blocks. The file system employs a three part block state indicator (V,A,U). V is a volume indication. A is allocation sequence indication. U is update sequence number indication. The file system (a) generates indication of the allocation sequence in the allocation map in a manner free of initially reading the block from storage memory, (b) records the indication of volume, allocation sequence and update sequence in an entry of the transaction log of the requesting computer node, and (c) sets indications of volume, allocation sequence and update sequence on the subject block in storage memory. Subsequent transactions on the subject block, by the requesting node are recorded in respective entries in the transaction log. Each respective entry reflects state of the subject block by indicating in the block state indicator the volume, allocation sequence and order of update sequence. The file system includes redo recovery means for updating blocks in the storage memory upon a failure in the computer system. For each block being updated, the recovery means utilizes one transaction log and the block state indicators recorded therein corresponding to indications of volume and update sequence in the block in storage memory.

27 Claims, 9 Drawing Sheets

COMPUTER METHOD AND APPARATUS FOR FILE SYSTEM BLOCK ALLOCATION WITH MULTIPLE REDO

BACKGROUND OF THE INVENTION

A computer system configuration in which a plurality of computers all access a collection of shared memory (i.e., disks) is called a "shared disk system". Restated, in a shared disk environment, multiple nodes (computers) of a cluster concurrently write to one or more shared disks. A system that exploits such a shared environment, such that multiple nodes access common data, is called a "data sharing" system. A distinguishing feature of data sharing and shared disk systems from other systems is that a data item can reside in the caches of multiple computers (nodes) and can be updateable from these nodes. That is, there is no one computer used as a server or coordinator; all system computers are peers in their access to the shared data.

FIG. 1 illustrates a typical data sharing environment of a computer system 11. A memory storage 14 comprises persistent storage (p-store) and thus is the system storage whose contents persist when part or all of the computer system 11 crashes. Traditionally, this storage 14 has been magnetic disk. A "page" of persistent storage is an automically updateable entity. An integral number of pages of persistent storage forms a block 18. Blocks 18 are the recoverable objects/entities of the computer system 11. Each block 18 is identified by a unique block identifier (BID).

Computer nodes 10A, 10B, and 10C of computer system 11 access memory storage 14 via a storage interconnect subsystem 19. Each node 10A, B, C supports one respective local cache 12A, 12B, 12C. Each cache 12 is a simple shared memory and the corresponding computer/node 10 may have multiple processors. Each cache 12A, B, C is formed of volatile storage for holding certain data blocks 18. A node 10 can operate only on blocks 18 which have been read from memory storage 14 into respective local cache 12. Because the local cache 12 is formed of volatile storage, the contents (i.e., locally stored data blocks 18) of the cache 12 may be lost during a system 11 crash.

Each node 10A, 10B, 10C has a respective, dedicated transaction log 16A, 16B, 16C. Each transaction log 16A, B, C is formed of a series of records, one record for each operation (or action) performed by the respective node 10 on corresponding cache data.

In the case of prior art data base systems, each node 10 is a cooperating computer running software to implement a database system. To that end, a node 10 reads a desired data block 18 from memory storage 14 into the node's local cache 12. The node 10 writes into a respective transaction log 16 logical changes to (i.e., operations on) data blocks 18 stored in local cache 12. Each transaction log 16 is a sequential file used to record information that permits an operation of a transaction to be performed again (redone), should the system 11 crash prior to committed data being written to memory storage 14. Recovery involving the transaction log 16 assures the durability of transaction effects in memory storage 14.

That is, after normal operation of the nodes 10 writing entries to respective transaction logs 16, computer system 11 writes the data back to memory storage 14. A distributive lock manager coordinates who (which node 10) updates a data block of 18 for the purposes of serializing operations on the data blocks 18. If the system 11 crashes during the time of data being updated and written back to memory storage 14, a recovery mode of operation must be undertaken.

The transaction logs provide recovery of state of the database after a system crash or failure. The illustrated data sharing system 11 utilizes one transaction log 16 for each node/computer 10. However, single log recovery approaches also exist. In the case of a single/central transaction log, a synchronization mechanism is required to enable the multiple nodes to write to the single transaction log during operation of the nodes. An example of a single log system is Microsoft's NTFS.

However, better scalability and performance is achieved using a multiple log approach as disclosed by David B. Lomet in "Recovery for Shared Disk Systems Using Multiple Redo Logs," Digital Equipment Corporation Cambridge Research Lab, Report CRL 90/4, Oct. 1, 1990. In Lomet, a separate transaction log 16 for each node 10 is used. This avoids the synchronization issues of the single log approaches. Lomet describes the technique of storing so called "before state identifiers" (BSI's) in each transaction log record. This means that each transaction log record contains the precise identity of the data block state that is seen before the logged action is performed.

The process of recovery makes all blocks 18 "current" (i.e., all updates to the blocks have been applied). Transaction log records are applied to a block 18 until there are no more transaction log records for that block 18. At this point the block 18 is said to be current. Further, the block 18 is considered to be "One-Log" because all transaction log records that need to be applied to the block 18 are held in a single transaction log 16. More specifically, the block is required to be One-log and a certain protocol is used to achieve this. Namely, the block is written to disk when ownership moves from one node to another.

A state identifier is used in Lomet to determine whether or not to apply a particular transaction log record. A state identifier is a definitive description of the block 18 contents and is much smaller than the complete state. A state identifier is defined by the system 11 storing a defining state identifier (DSI) in block 18. The DSI denotes the block state of the block in which the DSI is included.

During recovery, the system 11 knows whether a transaction log record applies to a block state by testing for equality between the transaction log record BSI and the defining state identifier (DSI) in the block. If the transaction log record BSI is determined to equal the block DSI, then the operation recorded in the transaction log record is executed on the data to transform the subject data block of the transaction record from its present state to a successor state.

As such, Lomet's scheme avoids concurrency control and coordination required for N-log recovery, by enforcing one-log redo and maintaining the independent redo recovery assumption. That assumption provides that the state of a data block 18 is able to be transformed to a successor state during redo recovery based solely on the state of the block at the time the original operation was applied and the contents of the transaction log record that describes the operation.

Using BSI's in this manner means that it is possible to identify which transaction log record to apply to a block 18 in some state, independently of transaction log 16 ordering or the number of transaction logs 16. One does not rely on the relative ordering of records between transaction logs 16; the test of determining whether or not to apply a transaction log record to a block 18 is inherent in their (the transaction log records) states. With the uniqueness of state identifiers and the one-log condition, during recovery, only one transaction log will contain a transaction log record with a BSI that matches a block's DSI.

Of further note, in a typical database system, the content of every block 18 is directly managed by the database system 11. Therefore, it is practical to include a state identifier in the definition of every block. Each block may be initialized in memory storage 14 when it is first allocated to the database. Initialization is an expensive operation, but it need not occur during normal operation of the database. Alternatively, the initial random state found in the data block 18 could be used as its initial state identifier. This requires that the block be read from memory storage 14 before its first use.

When a free (not allocated for use) data block 18 is reused, the previous contents are of no interest. However, Lomet's scheme requires that the block be read from memory storage 14 in order to generate a new unique state identifier for the block. In some applications this may be a significant performance cost.

In addition to Lomet's recovery method for database systems, other recovery methods/approaches exist for file systems in shared disk/data environments. In particular, file system specific recovery approaches for a shared disk environment include Open VMS's Files-11XQP and Digital Equipment Corporation's Frangipani. See McCoy, Kirby, "VMS File System Internals", Digital Press, 1990; and Thekkath, Mann and Lee, "Frangipani: A Scalable Distributed File System", Proceedings of the 16th ACM Symposium on Operating Systems Principles, pp. 224–237, ACM Press (October 1997). The Files-11XQP design uses a technique called safe writing which avoids the use of transaction logs (generically termed "logging"). As a consequence, Files-11XQP loses the benefits of logging/transaction logs.

On the other hand, Frangipani uses a multiple log approach very similar to Lomet's scheme. Frangipani is the only previous shared disk file system known by applicant to use logging. It avoids the problems of page allocation and initialization by relying on an underlying storage manager called Petal. Because Petal is a special storage management system, use of Frangipani is limited (i.e., does not operate directly with standard disks). However, Petal can use standard disks.

SUMMARY OF THE INVENTION

In the shared data/database system, Lomet assumes (i) a fixed number of pages and (ii) initialization of pages to prime the whole process. In contrast, space management is more complex in a typical file system. The majority of blocks contain user data (the contents of files). The contents of these blocks are determined entirely by application programs. They cannot hold a state identifier. Updates to these blocks are not logged.

Further, a minority of blocks hold file system metadata, such as directory information and file attributes. Metadata in database systems is not physically separated from data in the same way as in a file system. The database system has control over the page-level format of data as well as metadata. The file system may use logging to maintain the integrity of metadata blocks.

A file system (such as Open VMS Files-11XQP) may reserve part of the memory storage 14 to hold an array of one metadata block for each file. These blocks, sometimes called file headers, hold file attributes. They are organized as an array so that file attributes may be indexed by a file number. They are not used to hold user data (file contents); therefore, a state identifier, once written, will remain valid. However, other metadata blocks, such as directory blocks, may be allocated from a more general pool of free (unallocated) blocks. The design of a file system is simpler, and offers easier system management, if this pool is the same as that used for user data file contents. However, this means that in normal operation, blocks may be allocated from user data to metadata and back again. When a block is used for user data, any previous state identifier will be erased by file contents. Lomet's scheme is relatively expensive if each newly allocated metadata block must be initialized in memory storage 14 before it is used.

The present invention overcomes the foregoing problems and the problems of the prior art by providing an enhanced file system. Specifically, in a computer system having a plurality of computer nodes sharing storage memory, the present invention file system comprises:

an allocation map for indicating use of blocks of the storage memory;

a plurality of transaction logs, a different transaction log for each computer node, for recording a sequence of data transactions by the computer node on a block in the storage memory, each transaction log formed of a plurality of entries, a different entry for each data transaction of the respective computer node;

a block state indicator for each transaction log entry, the block state indicator being with respect to a subject block from the storage memory; and recovery means for updating blocks in the storage memory upon a failure in the computer system, for each block being updated.

In the preferred embodiment, each block state indicator provides an indication of (i) volume, (ii) allocation sequence and (iii) update sequence (or count number) of the block. The indication of allocation sequence is generated in (or otherwise determinable from) the allocation map such that upon the file system allocating use of the subject block in response to a requesting computer node, the file system (a) sets indication of the allocation sequence in the allocation map and in storage memory, in a manner free of initially reading the block from storage memory, (b) records the indication of volume, allocation sequence and update sequence in an entry of the transaction log of the requesting computer node, and (c) sets indication of volume, allocation sequence and update sequence on the subject block in storage memory. Subsequent transactions on the subject block by the requesting node are recorded in respective entries in the transaction log, each respective entry reflecting state of the subject block by indicating in the block state indicator the volume, allocation sequence and update sequence.

The recovery means uses one transaction log and the block state indicators recorded therein, corresponding to indications of volume, allocation sequence and update sequence in the block in storage memory. As such, the present invention file system supports one-log redo and maintains the independent redo recovery assumption without the disadvantages of the prior art (and particularly Lomet's approach).

In a preferred embodiment, the recovery means updates a block in the storage memory according to a transaction log entry if [$V'=V$ and $A'>A$] or [$V'=V$ and $A'=A$ and $U'=(U+1)$ mod $W$] where $U'$ is the update sequence indication in the transaction log entry;

$V'$ is the volume indication in the transaction log entry;

$A'$ is the allocation sequence indication in the transaction log entry;

$V$ is the volume indication of the block in storage memory;

A is the allocation sequence indication in the block in storage memory;

U is the update sequence indication of the block in storage memory; and

W is word size in the computer system.

In accordance with one aspect of the present invention, the allocation map includes a file allocation map and a block allocation map. The file allocation map preferably indicates use of metadata (e.g., file header) blocks.

In accordance with another aspect of the present invention, a counter is coupled to the allocation map for determining or generating the allocation sequence. The counter is incremented each time a computer node of the computer system causes a block to be allocated. The transaction log entries record the requesting computer node transactions on the subject block by indicating a same allocation sequence throughout the block state indicators of those transaction log entries, while the corresponding update sequence indication is sequentially increased from a first one of said transaction log entries to succeeding ones.

In another embodiment of the present invention, a wild-card block state indicator is employed. The wild-card block state indicator has the capability to update any block that has a random block state indicator. In particular, the wild-card block state indicator has an update sequence number equal to 0. To that end, the recovery means updates a block in the storage memory according to a transaction log entry if and only if [V'≠V and U'=0] or [V'=V and A'>A] or [V'=V and A'=A and U'=(U+1) mod W].

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
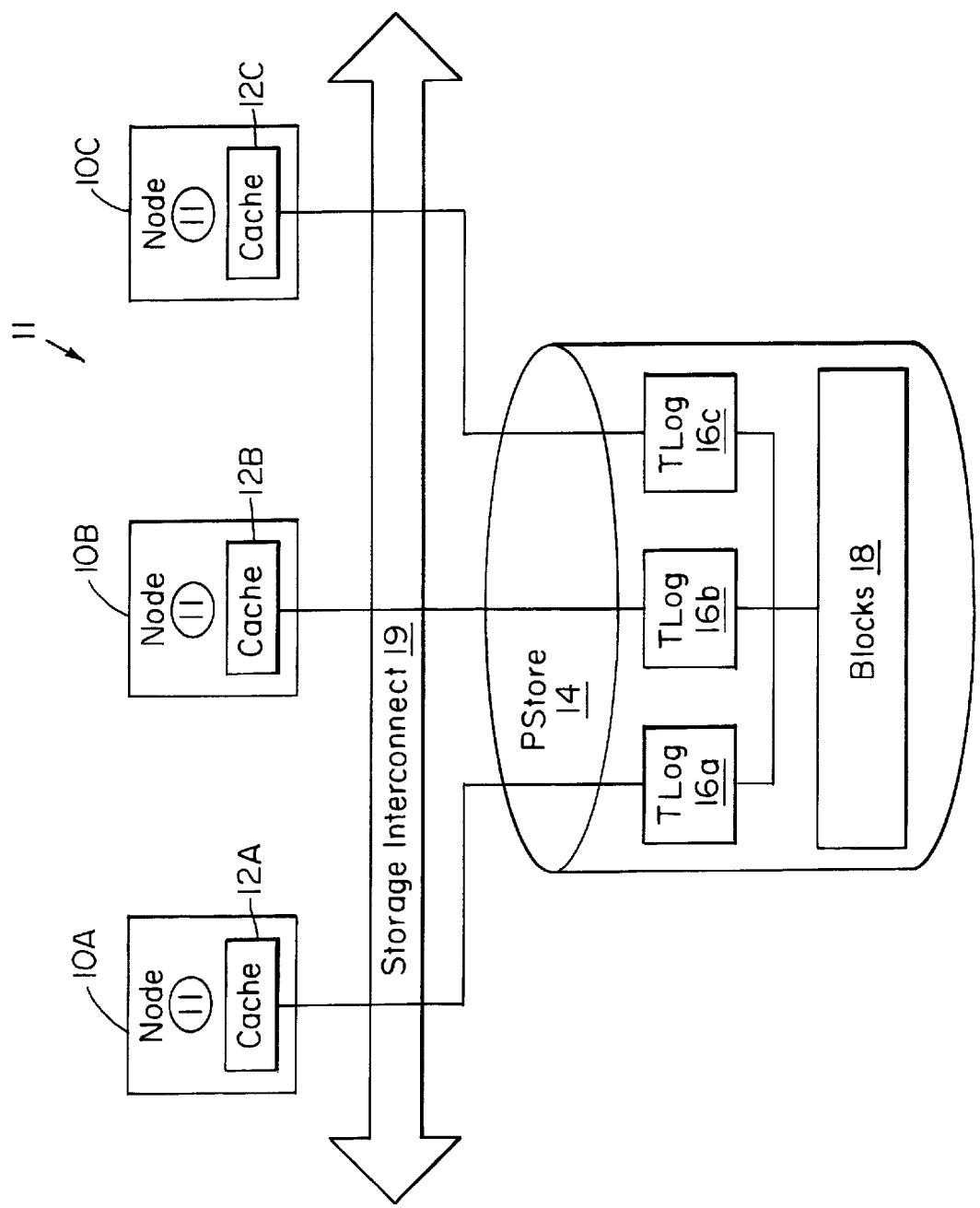
FIG. 1 is a block diagram of a shared disk environment.

The present invention file system generally operates in a shared disk environment similar to the shared data environment illustrated in FIG. 1. In that Figure, for the present invention, each node 10 runs software for implementing the file system 54 (FIG. 3A) instead of a database system as described previously for the prior art. Respective caches 12 are file system caches instead of database caches as described for the prior art. The disk blocks 18 for the file system 54 of the present invention are further illustrated in FIG. 2 in more particular terms.

Figure 2:
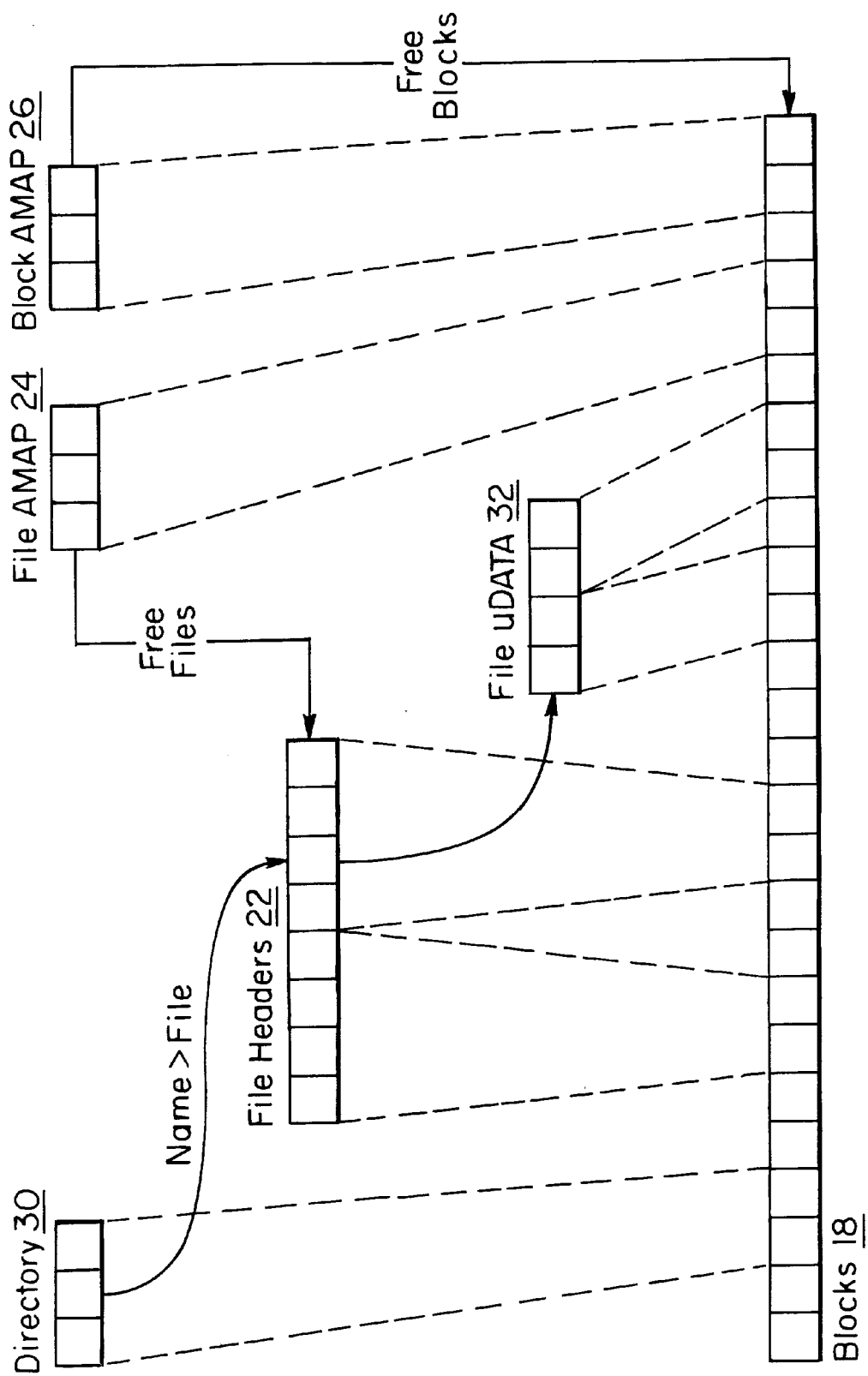
FIG. 2 is a schematic overview of disk blocks from the shared environment of FIG. 1 as employed by a file system of the present invention.

In FIG. 2, the recoverable entity (formed of page units of memory) in disk/persistent storage memory 14 are called blocks 18. At any given time, each block 18 is in one of three possible states—Free (not allocated for use), MDATA (allocated for use as metadata, such as file header or directory data as explained below) and UDATA (allocated to hold file contents or user data). The blocks 32 that are allocated for file contents/user data are indicated as UDATA in FIG. 2. These blocks 32 are not controlled by logging because the contents of these are determined entirely by application programs. Block allocation map 26 indicates free or available blocks 18 not currently allocated to user or other data.

A certain number of reserved blocks provide file headers 22, one block for each file. Each file header block 22 indicates (i) where respective file contents reside on disk 14 (e.g., by disk block address or a pointer to disk location) (ii) file attributes (e.g., creation date, security info, etc., of the respective file), and (iii) file number identifying the respective file of user data and associated file attributes. The file header blocks 22 are organized as an array of disk blocks with file attributes indexed by file number of the respective file.

A file allocation map 24 indicates free or available file header blocks 22 (i.e., those in the reserved pool/certain number of blocks which are not currently in use). The file allocation map 24 also allocates the file numbers and their associated file attributes to the file header blocks 22.

Directory blocks 30 are allocated from a general pool of available blocks 18 and cross reference file names and file numbers pointed to by file header blocks 22. Preferably directory blocks 30 are implemented as a b-tree hierarchy. Other implementation designs are suitable.

In the preferred embodiment, file allocation map 24 and block allocation map 26 are preferably implemented by respective bit maps. Each bit map is an array of bits, with one bit per block 22, 18. When a block 22, 18 is allocated to metadata or user data, the corresponding bit is set in the bit map to indicate that the block is in use. When the block 22, 18 becomes free, the bit is cleared. Each allocation map 24, 26 is itself held in memory storage 14 as a number of metadata blocks, each representing the state of a fixed number of blocks. In other words, a relatively small number of blocks 18 are file and block allocation maps blocks 24, 26. Such are marked as allocated within the block allocation map 26.

The invention extends the use of the file and block allocation maps 24, 26, to store additional information. It does not require any specific implementation of the allocation maps 24, 26 except that: (i) it should be possible to define a permanent association from sets of blocks 22,18 to single allocation map blocks 24, 26; (ii) each associated allocation map block 24, 26 must provide storage for a small amount of extra information that can be written cheaply to memory storage 14 when the allocation map 24, 26 block is updated to record the allocation of a blocks 22, 18.

A file header block 22 may be in a free state or hold metadata. The file allocation map 24 blocks and block allocation map 26 blocks are more or less permanently allocated to that purpose. For directory blocks 30, the underlying storage block may be released to hold user data (but then that block is not a directory block at that time); otherwise the underlying storage block holds the directory metadata. The remaining blocks 18 are either in a free state or hold user data/file contents.

As previously mentioned, in the prior art the database system 11 analogous to the file system 54 of the present invention assigns each block a state identifier. Whenever the block is allocated, the system 11 assigns a new state identifier. In each transaction log record, the block state identifier (BSI) is recorded along with the operation executed by the node on the subject data. Upon a system 11 crash or failure, the defining state identifier (DSI) of a disk block is compared to the BSI of a transaction log record to determine whether the transaction log record applies or not. If so, then the operation of the transaction log is executed on the block data to appropriately update the same.

However, the prior art database recovery approach assumes a fixed number of pages per disk block 18, whereas blocks in file systems potentially change between user data and metadata states. The prior art database recovery approaches do not contemplate such a change in block state because the physical separation of metadata from data does not exist in database systems. Further, the prior art database recovery approach depends on an initialization/reinitialization of newly allocated blocks 18 in p-store 14 before use. Thus in applying the prior art database system recovery methods to a file system results in the following three problems.

1. When a metadata block is deallocated and then reused for metadata, Lomet's scheme requires that the block be read from disk/memory storage 14 to determine its state identifier. In a system where deallocation and reuse is frequent (such as in a file system), it is desirable to eliminate this read which is costly in processor time.

2. When a block's content may be changed outside of the control of the database system (as with file system user data blocks), some method is needed to prevent state identifiers from being confused with random data set by application programs. In particular, a block might be used for metadata, then deallocated and reallocated for user data. If the transaction log records for that block remain in any transaction log 16, there is a risk that on recovery, a transaction log BSI may match a random DSI in the block 18. In Lomet's scheme the disk block 18 would be updated from the transaction log 16 and hence corrupted.

3. When a block is allocated for metadata, it may not have a valid state identifier. Either the block has never been used for metadata, or its previous metadata contents were overwritten when the block was currently used for metadata. This problem may be prevented by writing a newly allocated metadata block with an initial block to p-store 14, before writing any transaction log record. This is an expensive solution and a way to eliminate this write to disk/memory 14 is desirable.

Applicant's invention starts with the premise that in a typical file system, a majority of the disk blocks 18 contain user data. Recall that contents of these blocks 18 are determined entirely by application programs and cannot hold state identifiers. Updates to these blocks 18 are not logged. The minority of blocks 18 holding file system metadata (e.g., blocks 30, 22 holding directory information and file attributes), may more appropriately use logging to maintain the integrity of these blocks 30,22.

Also, other metadata blocks, such as directory 30 blocks, may be allocated from a more general pool of free blocks 18. The design of a file system is simpler and offers easier system management, if the same pool of blocks 18 is used for allocating these metadata blocks as for allocating user data blocks. However, this means that in normal operation, disk blocks 18 may be allocated from user data to metadata and back again. Thus, different sets of blocks from a general pool of blocks 18 would be allocated as metadata and others as file contents/user data at one time but reused subsequently for metadata. When a block is used for user data, any previous state identifier is erased by file contents and unusable for the subsequent metadata state.

Therefore, in the present invention the file system 54 (FIG. 3A) assigns each block from disk/persistent memory storage 14 a three part state indicator, and each transaction log 16 record holds a respective three part block state indicator corresponding to the block which is the subject of an operation/transaction being logged/recorded. Preferably the block state indicator is implemented as a vector (V,A,U). V is a volume identifier; A is an allocation sequence number, and U is the update sequence number. Details of each of these vector parts are discussed next.

V is a random and sufficiently large number such that the probability of it occurring in file contents/user data (e.g., application programs) is negligible. In the preferred embodiment, the file system 54 does not allow application programs to read the volume identifier from an unwritten user data block that was previously a metadata block. This is implemented (similar to some existing file systems) by a suitable mechanism (known as high water marking) in which allowing an application program to read an unwritten data block is a security violation. The present invention file system 54 assigns the volume identifier V when newly allocating a block to the metadata state.

In the preferred embodiment, the volume identifier V is a 64-bit random generated number.

The role of the volume identifier V is to prevent an old transaction log record from being applied to a deallocated block 18 which now contains user data. A different value of V (volume identifier) is required for each volume, rather than a pseudo-random number fixed for the system. This is because a volume might be deleted and memory storage 14 reused for a new volume without overwriting contents of blocks 18.

The allocation sequence number, i.e., second part of the vector (denoted A), is generated in the corresponding allocation map block 24,26 for the subject disk block 18,22. The allocation sequence number A is incremented (in allocation map block 24,26) on allocation of the subject disk block 18,22. Where the allocation map 24,26 block is written to disk after every allocation anyway, A is conveniently copied into the memory page on disk of block 18 corresponding to the allocation map 24,26 block. Also as a consequence of the allocation sequence number being generated (and more particularly obtainable) in a corresponding allocation map block 24,26, the corresponding memory page from disk does not have to be read when allocating/reallocating the subject disk block 18,22.

The role of the allocation sequence number A is to preserve the block state indicator sequence when the block 18,22 is deallocated. When a block 18,22 is reallocated with a previous block state indicator, the present invention allocation number A (as determined from allocation map block 24,26) makes it possible to generate a new block state indicator that updates the previous block state indicator without reading the block 18,22 from disk to obtain the new block state indicator.

Each time a block 18,22 is allocated to metadata from a free state, the file system 54 resets the update sequence number U (the last part of the vector) to 1 and increments U on each update of the metadata.

In recovery mode, the present invention file system 54 performs an update of a disk block with the corresponding transaction log records according to the following rule:

(V',A',U') updates (V,A,U) if and only if

V'=V and A'>A; or

V'=V and A'=A and U'=(U+1) mod W, where W is the word size of the computer system. That is, if the transaction log record vector (V',A',U') has values that satisfy the above rule with respect to a block having a state indicator of (V,A,U), then the block is updated by the operation recorded in the transaction log record.

The comparison of allocation sequence numbers is A'>A rather than A'=A+1 because the allocation sequence number in an allocation map block 24,26 is incremented when any associated free block is allocated. Therefore, the allocation sequence number A for an individual block 18,22 may change by more than 1 when the block is reallocated.

It is noted that A will eventually overflow the word size of the computer. Some scheme is needed to allow operation to continue when this point is eventually reached. For example, when A overflows, A is reset to 1. All unused blocks associated with the allocation map blocks 24, 26 are initialized to (V,0,0) so that the allocation sequence number in the page/block is still less than the new allocation sequence number in the allocation map.

Further, it is noted that before a block 22,18 is used for a first time, the block must be initialized in memory storage 14 with a corresponding initial state indicator of (V,A,0). This is performed, for example, immediately before the block is used or in pre-allocation batches (e.g., of the reserved file header blocks 22).

Referring now to FIGS. 3A–3F, an example of block allocation with multiple redo recovery by the present invention file system 54 is provided.

Figure 3A:
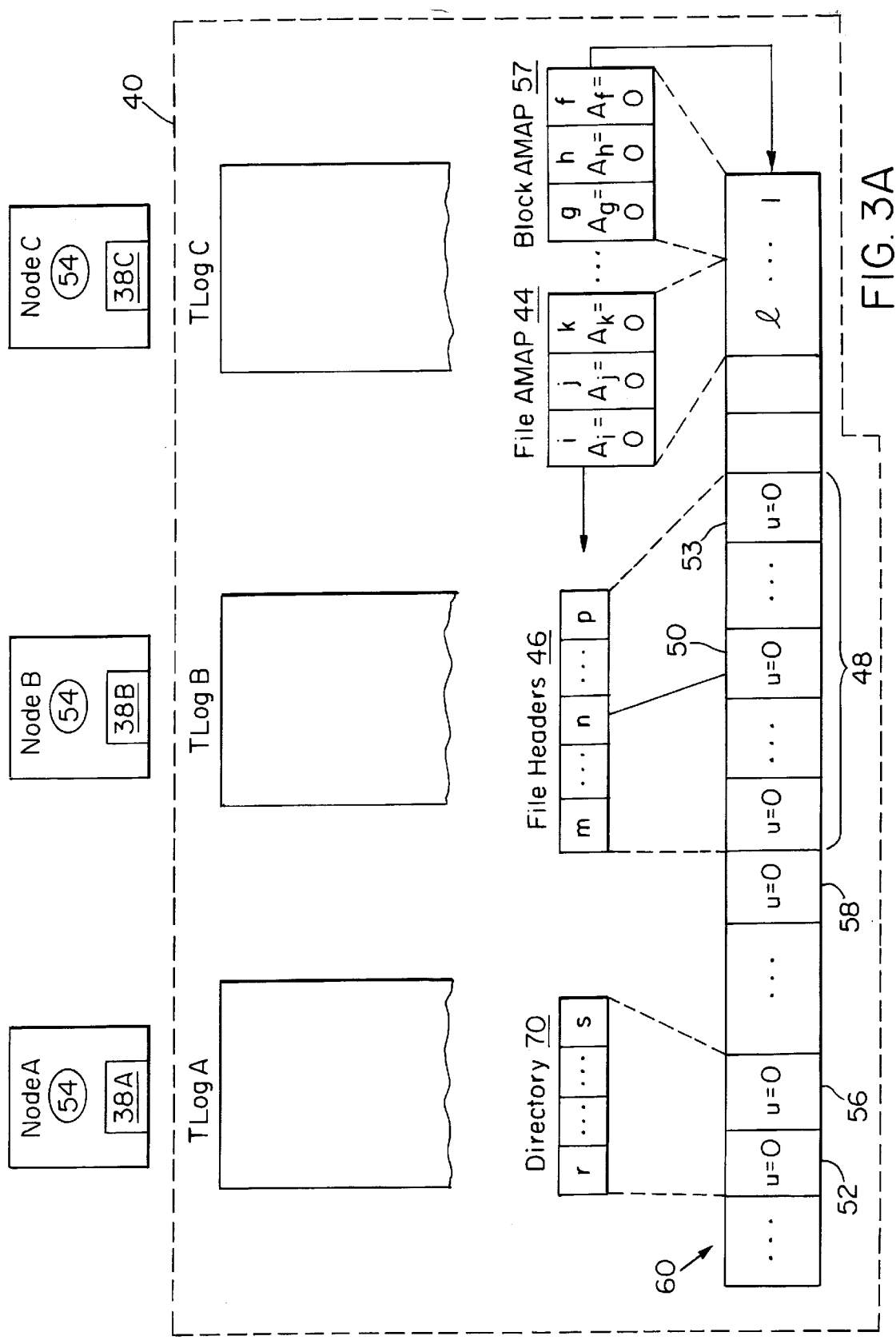
FIGS. 3A–3F are schematic illustrations of file system block allocation and redo recovery by the file system of the present invention.

FIG. 3A (with analogous elements of each of FIGS. 1 and 2) illustrates computer nodes A,B,C with respective caches 38A, 38B, 38C and dedicated transaction logs T $Log_A$, T $Log_B$ and T $Log_C$ sharing data stored on disk or other shared persistent memory storage 40. Upon initialization of the file system 54, a predetermined number of reserved blocks, say for example 1 through L of disk block array 60, are allocated to form black allocation map 57 and file allocation map 44. Preferably, file allocation map 44 and block allocation map 57 are implemented as respective bit maps. The corresponding bits in block allocation 57 bit map representing blocks 1 through L are set to 1 to indicate that these disk blocks are in use and in particular that these blocks are allocated (preallocated) to hold metadata. Another group or pool of blocks 48 from disk block array 60 is reserved and preallocated through block allocation map 57 to serve as file headers 46. To that end, file header blocks 46 are allocated as metadata (e.g., to store file numbers, indications of file attributes and disk block addresses of file contents). Also as part of this preallocation, control of subject blocks 48 is assigned to file allocation map 44. That is, just as block allocation map 57 blocks f,g,h hold a bit map for indicating usage/Free state of disk array blocks 60, file allocation map 44 blocks i,j,k hold a bit map for indicating usage/Free state of file header blocks 46 including blocks m,n,p.

Also illustrated in FIG. 3A, disk array blocks 52,56, form directory 70. That is, through block allocation map 57, disk array blocks 52,56 are allocated as metadata directory blocks r through s. Recall that directory blocks r through s cross reference file names with file numbers indicated in file headers 46.

For purposes of clarity in illustrating the present invention, only a few of the blocks forming file allocation map 44, block allocation map 57, file headers 46 and directory 70 are designated (at f,g,h,i,j,k,m,n,p,r,s) in FIG. 3A. It is understood that several such blocks exist and are similarly treated.

Further, each/all disk array blocks 60 have an individual respective update sequence number. In the instant example, during the preallocation of directory blocks 70 and file headers 46, the update sequence numbers of the corresponding disk array blocks 48,52,56 are initially set at 0.

Each file allocation map 44 block (i, . . . j,k) and each block allocation map 57 block (f, . . . g,h) has a respective counter $A_i,A_j,A_k,A_f,A_g,A_h$, respectively, for effectively generating and indicating the allocation sequence number A of a respective block allocated from disk array 60. During initialization of file system 54, each of these counters (and hence allocation sequence number A) is set to 0. Each time a block is allocated from disk, either through file allocation map 44 or block allocation map 57, the file system 54 increments a corresponding counter (i.e., one of counters $A_i,A_j,A_k,A_f,A_g,A_h$)

Figure 3B:
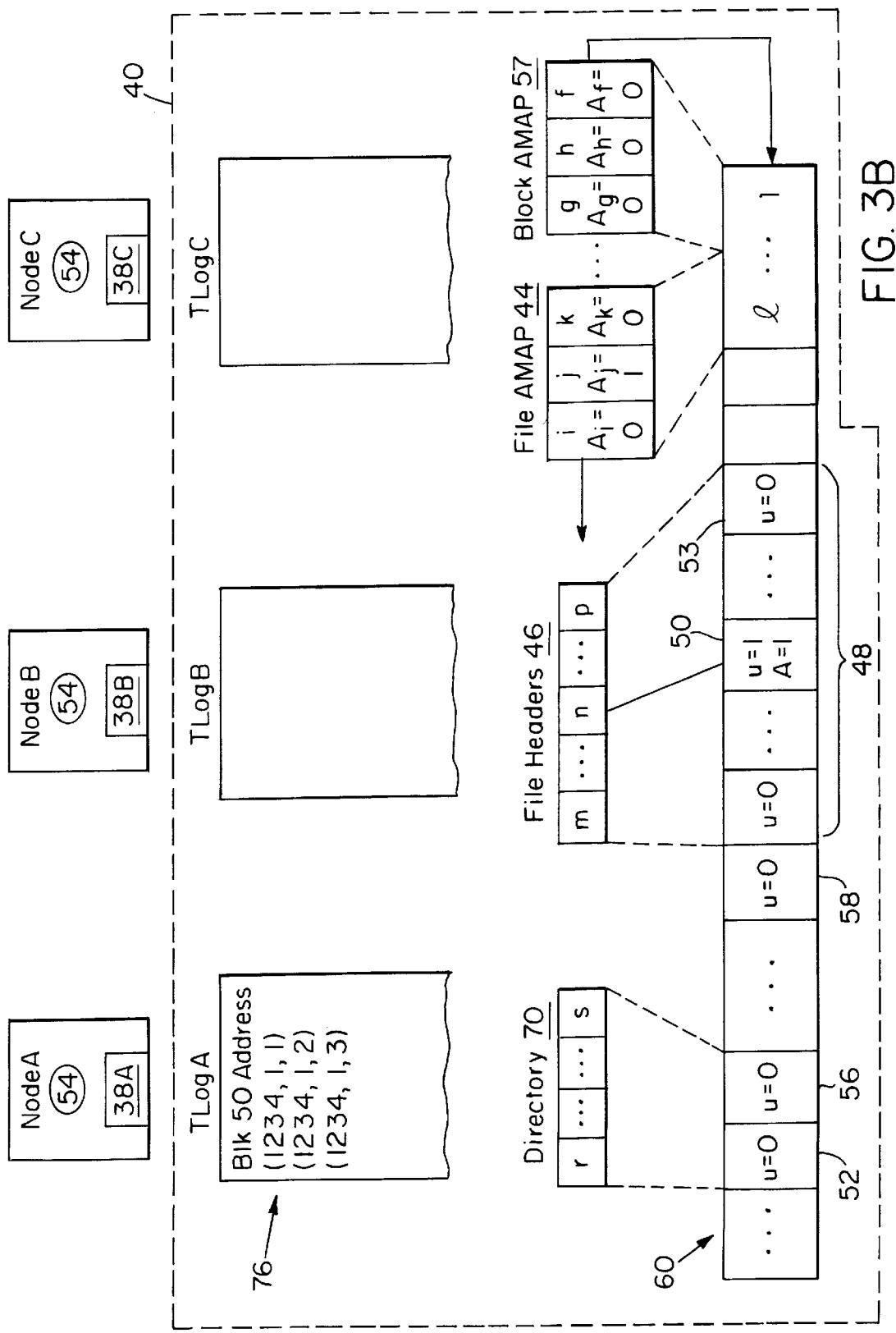

In FIG. 3B, node A wants to put into use file header block n, for example. As such, node A causes the file system 54 to look at the file allocation map 44 and find a clear bit which corresponds to a file header block n in Free state. The clear bit is in file allocation map block j, for example. The file system 54 increments the file allocation map block j counter $A_j$ from initial value of 0 to 1 and sets the subject bit in the bit map.

Consequently, the file system 54 assigns a value of 1 to the allocation sequence number A for newly allocated disk block 50 corresponding to the file header block n. The subject disk block 50 being newly allocated causes the file system 54 to reset the respective update sequence number U to 1, without reading the block 50 from disk to cache 38A of node A. It is noted that since block 50 is being allocated from a Free state, the contents of block 50 are not of concern. Thus, the only reason in the prior art to read disk block 50 from disk was to obtain the state identifier number (the parallel to the present invention update sequence number U). The foregoing resetting of the update sequence number U, upon allocation, by the present invention file system 54 alleviates any need for this costly "read" from disk of the prior art.

The file system 54 also employs a random number generator to generate a value for V, the volume identifier of the current blocks on disk array 60. For the illustrated example V=1234. As a result, the subject disk block 50 state indicator vector (V,A,U) is formed with values V=1234, A=$A_j$=1 and U=1, and is thus (1234,1,1).

Node A begins to enter transactions in its transaction log T $Log_A$ with respect to data manipulations of the subject disk block 50 (file header block n) in respective cache 38A. To initialize T $Log_A$ with respect to subject disk block 50 activity, node A records (a) the disk array address of disk block 50 and (b) the block state indicator vector value of (1234, 1, 1) in the first log entry of T $Log_A$. Such is illustrated at 76 in FIG. 3B. As node A makes data (file content) changes to the subject disk block 50 (corresponding to file header block n and held in cache 38A), the T $Log_A$ entries indicate the block state vector increasing in update sequence number U value (i.e., (1234, 1, 2), (1234, 1, 3), . . . ), but not changing in V value or allocation sequence A value as illustrated in FIG. 3B.

It is noted (and understood by those skilled in the art) that a transaction log record is also written for the updated file allocation map block j. For ease and clarity in understanding and illustrating the present invention, such transaction log records are omitted from the drawings and not discussed at each appropriate time in the examples of FIGS. 3A–3G. It is understood, however, that such transaction log records are supported in embodiments of the present invention.

Figure 3C:
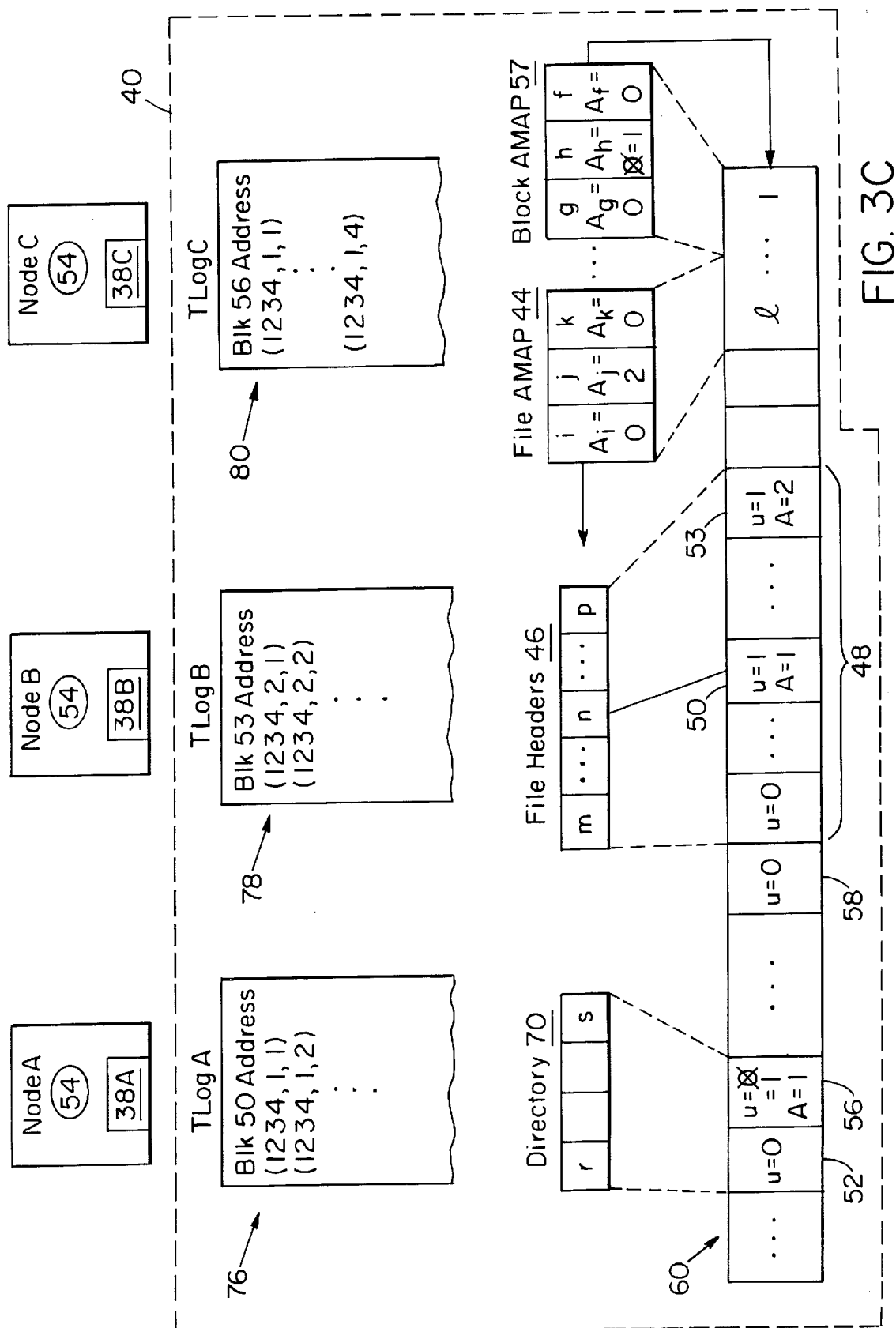

Meanwhile, node B similarly puts into use a file header block p from a Free state (illustrated in FIG. 3C). Say, the clear bit corresponding to this file header block p and its respective block 53 on disk are in file allocation map block j (just like the bit set by node A in FIG. 3B, for example). Likewise, file system 54 setting this new bit causes file allocation map block counter $A_j$ to increase to 2.

Further, the file system 54 uses the value previously generated for V (i.e., 1234) and resets the update sequence number equal to 1 for the disk block 53 corresponding to subject file header block p. As a result, the disk block 53 has a state indicator vector value of (1234, 2, 1), and T $Log_B$ of node B has a first entry 78 (FIG. 3C) reflecting the same vector value (1234, 2, 1). As node B makes data/file content changes to disk block 53/file header block p in corresponding cache 38B, the file system 54 records in T $Log_B$ entries of increasing update sequence number U, e.g., (1234, 2, 2), (1234, 2, 3) . . . , but maintaining the same V=1234 value and allocation sequence A=2 value.

Similarly, Node C puts into use a directory block s from a Free state (also illustrated in FIG. 3C), to cross reference file header block n/disk block 50 for instance. The clear bit in block allocation map 57 corresponding to directory block s is in block allocation map block h, for example. File system 54 sets this bit to 1 and in turn increments counter $A_h$ by one, from a current value, say 0 to 1, as illustrated in FIG. 3C. Further, file system 54 uses the value previously generated for V (i.e., 1234) and resets the update sequence number equal to 1 for disk array block 56 corresponding to directory block s.

As a result, file system 54 forms a state indicator vector of (1234, 1, 1) for disk block 56, and T $Log_C$ has a first entry 80 (FIG. 3C) reflecting the same vector value (1234, 1, 1) along with the address of disk block 56. As node C makes data changes to directory block s/disk block 56 in cache 38C, the file system 54 records the transactions in T $Log_C$ entries of increasing update sequence number U, e.g. (1234, 1, 2) . . . (1234, 1, 4), but same V=1234 and A=$A_h$=1 value.

Figure 3D:
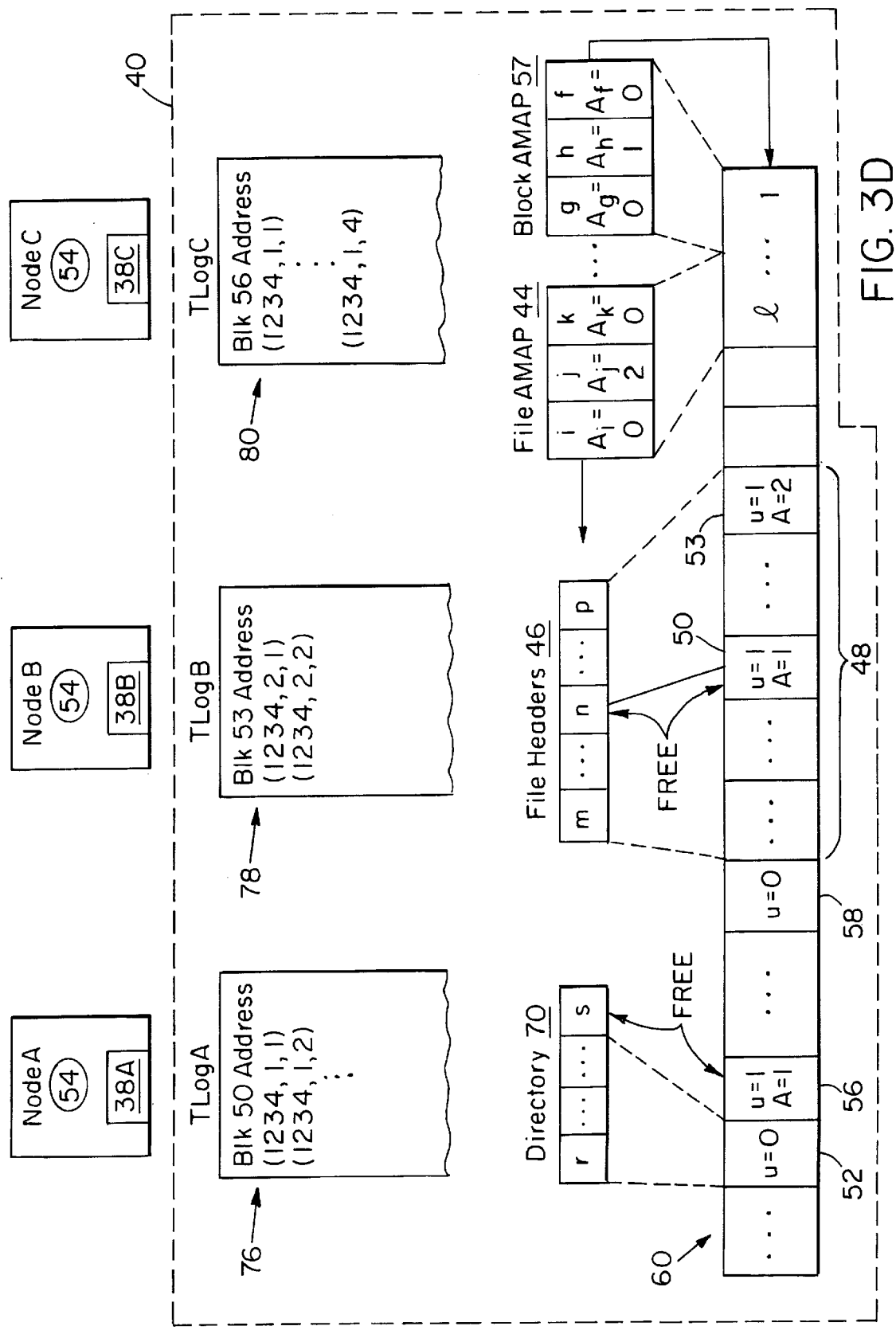

In addition, node A may subsequently deallocate a working block, say for example the file header block n (disk block 50). The file system 54 in FIG. 3D clears the corresponding bit in the file allocation map 44. Further, say for example that newly deallocated header block n contained data relating to a certain file. The corresponding directory block s cross referencing that file is also deallocated by file system 54 in response to node A's latest actions. In particular, file system 54 deallocates subject block 56 from its initial metadata state (used in directory 70) to a Free state as indicated in FIG. 3D. File system 54 sets the corresponding bit in block allocation map 57 to 0 to indicate that block 56 is now available and no longer in use (i.e., is Free state).

Figure 3E:
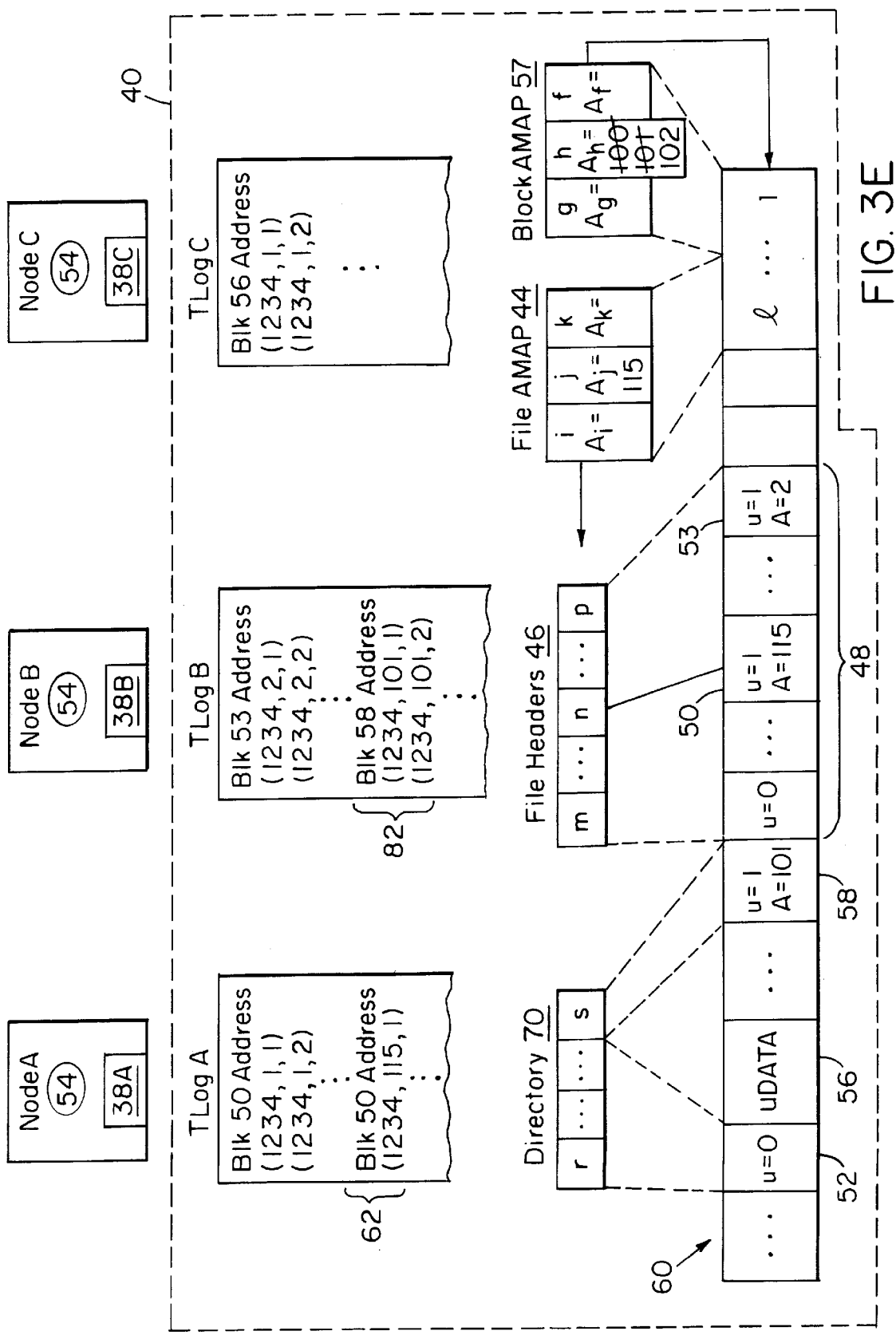

As can be seen from FIGS. 3A–3D, over time as nodes A,B,C cause file header blocks m,n,p and directory blocks r,s (and hence corresponding disk blocks 48, 50, 53, 52, 56) to be allocated/deallocated, the file system 54 increments the file allocation map 44 and block allocation map 57 counters $A_i, A_j, A_k, A_g, A_h$, and $A_f$ at a different rate than the update sequence numbers U of disk blocks. So, for example, the next time node A reallocates file header block n (disk block 50) to a metadata state, the file allocation map 44 counter $A_j$ may be incremented from 114 to 115 for example (FIG. 3E). Then the file system 54 would reset block 50 update sequence number to 1 and assign corresponding disk block 50 an initial block state indicator vector value of (1234,115, 1), for example, for the current session of data transactions. Thus, T $Log_A$ would record entries 62 reflecting block state indicator values (1234,115,1) . . . (1234,115,7) . . . for this session's transactions on disk block 50 in cache 38A as illustrated in FIG. 3E.

It is noted that in contrast to the prior art, file system 54 eliminates the need to read block 50 from disk to obtain an update sequence number (a state identifier number in the prior art). Instead of using elapsed time waiting for such a read from disk/persistent memory 40, file system 54 simply directly assigns (resets) the block update sequence number U value to 1. Thus, the present invention provides an improved metadata block allocation (i.e., reallocating for metadata, a previously deallocated metadata block, such as blocks 48,50) as illustrated in FIG. 3E. As such, the present invention provides a solution to Problem 1 stated above.

Continuing with the example in FIGS. 3E and F, by the time one of the nodes A, B, C puts disk block 56 back into use by reallocating it as metadata, corresponding block allocation map 57 counter $A_h$ may equal 109, for example, as follows. After file header block n (disk block 50) is reallocated to metadata, file system 54 must find an available block from disk array 60 to currently serve as a directory block for cross referencing now reallocated file header block n (disk block 50) of FIG. 3E. Thus, file system 54 through block allocation map 57, allocates block 58 as a directory 70 block for cross referencing reallocated file header block n (disk block 50). In turn, file system 54 sets the corresponding bit in block allocation map 57 to indicate block 58 is now in a metadata (and not Free) state, and increments corresponding block allocation map 57 counter (which happens to be) $A_h$ from say 100 to 101. Also file system 54 resets disk block 58 update sequence number to 1 (FIG. 3E) and forms state indicator vector (1234, 101, 1).

Say for example, Node B performs the foregoing and other data transactions on disk block 58 in cache 38B. T $Log_B$ would then record disk block 58 memory address and state indicator vectors (1234, 101, 1), (1234, 101, 2) . . . and so on as illustrated at 82 in FIG. 3E.

Meanwhile, node C puts disk block 56 back into use. Recall from FIGS. 3A–3C, that disk block 56 was once directory block s and cross referenced file header block n (disk block 50). This time, node C reallocates block 56, not as metadata as before, but as user data. In response, file system 54 sets the corresponding bit to 1 in block allocation map 57 and increments corresponding counter $A_h$ from 101 to 102 (FIG. 3E).

Note that unlike file header block n (disk block 50) which is restricted to metadata and free states (as defined by the preallocation/file system initialization process discussed above), disk block 56 may be allocated as user data or metadata. As such, the data changes to disk block 56, newly allocated as user data, are not logged in T $Log_C$ but are completely controlled by application program(s) running on node C. Consequently, disk block's 56 update sequence number is typically overwritten by the application program.

Figure 3F:
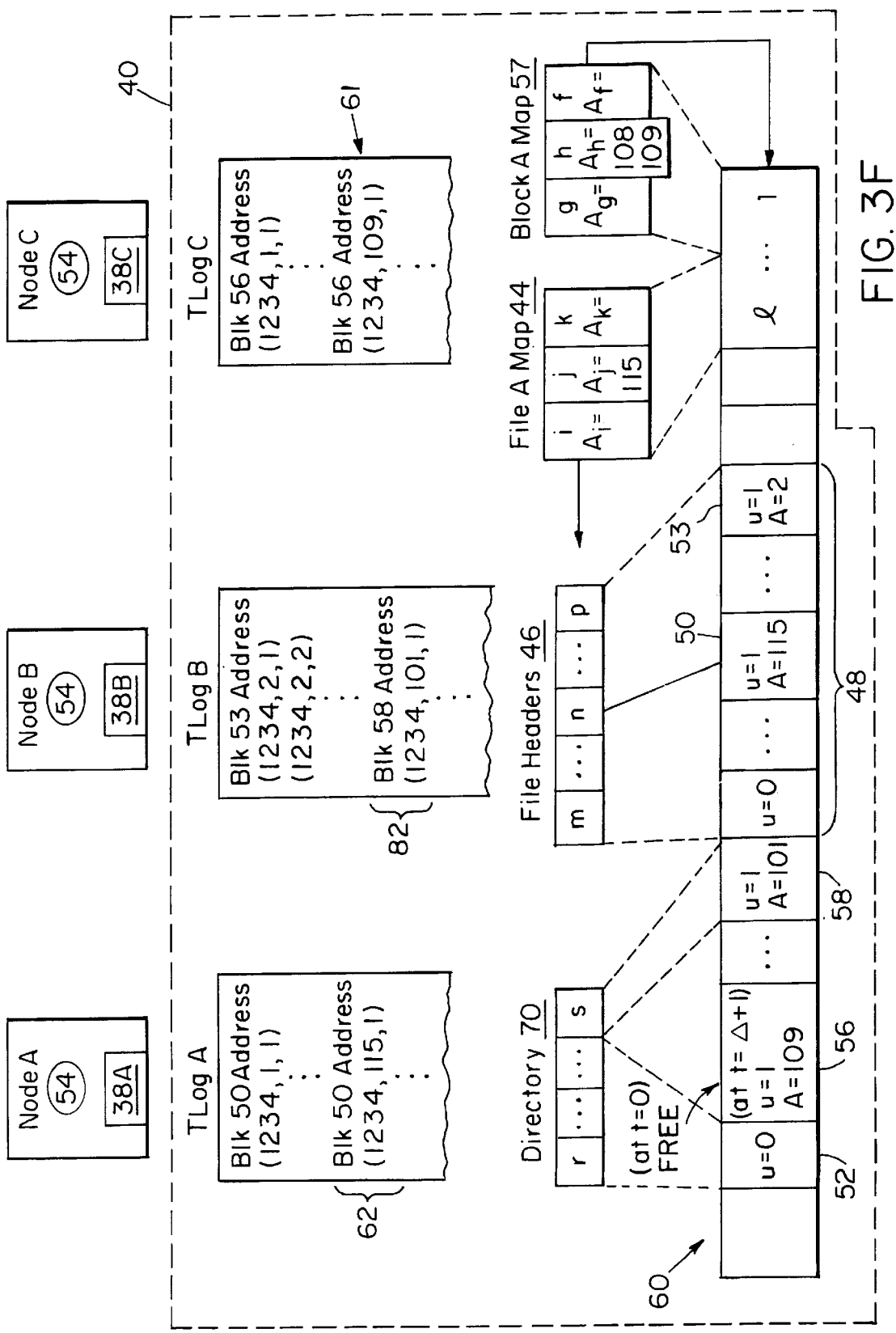

By the time node C deallocates disk block 56 some period of time Δ has passed, which means some amount of allocations/deallocations have occurred involving disk array blocks 60 corresponding to bits in block allocation map 57 block h. Consequently, the counter $A_h$ of block h has been increased many times. For this example, say node C deallocates disk block 56 at the time counter $A_h$=108 as illustrated in FIG. 3F. Upon node C deallocating disk block 56 from user data to free state, file system 54 sets the corresponding bit to 0 in block allocation map 57.

At a subsequent time (t=Δ+1), one of the nodes A,B,C (say node C) reallocates disk block 56 from its current free state to metadata. In turn, file system 54 sets corresponding block allocation map 57 bit to 1 (to indicate that block 56 is in use) and increments corresponding counter $A_h$ to 109. In turn, file system 54 stores allocation sequence A=109 on subject block 56. Further, file system 54 renews and resets disk block's 56 update sequence number to 1, which was overwritten during the time disk block 56 was used for user data (in FIG. 3E). To that end, file systems 54 forms state indicator vector (1234, 109, 1) for disk block 56 and corresponding T Log$_C$ entry 61 as illustrated in FIG. 3F.

It is noted that when allocating a general pool disk block (such as block 56) for metadata, the block may not have a valid update sequence number U. In contrast to prior art, for each general pool block allocation to metadata, the present invention file system 54 does not write an initial block to disk, to provide a valid update sequence number. Instead of such a costly block initialization, the present invention file system 54 directly resets/assigns an update sequence number equal to 1 during allocation of the subject block to metadata as illustrated in FIG. 3F. This solves Problem 3 stated above.

Whenever a specific disk block moves between caches 38A, 38B, 38C (or, restated, there exists a change in recording transactions on a disk block from the transaction log of one node to the transaction log of another node), the file system 54 writes to disk 40 the cache 38 version of the disk block as updated by the corresponding transaction log entries. This ensures one-log redo recovery.

That is, if there is a failure in the computer system before such a write to disk 40, then only pertinent entries from the transaction log of the last node to change a given block needs to be redone for the block. To find that transaction log, the file system 54 searches for a log entry indicating the disk address of the subject block. Next, within the found transaction log, file system 54 determines the sequence of log entries to apply to the subject block according to those log entries having a V' value equal to the V value of the block vector and an A' value greater than or equal to the A value of the block vector. The file system 54 then updates the block version in the cache 38 from the transactions recorded in the entries of the found transaction log according to the "updates" relationship/rule previously discussed.

If the failure in the computer system is after such a write to disk 40, then the disk version of the block must be checked to see if it is "current" (i.e., has all updates already performed on that version). However, to ensure that no transaction log has further updates for the block, the foregoing steps are taken here. Otherwise, a current disk block needs no redo recovery.

If the failure in the computer system is during such a write, then the foregoing steps to find pertinent transaction log entries to apply to the cache version of the block are taken. Remember where the transaction log entry indicates a value of A equal to the disk block value of A (allocation sequence number), there is an unbroken sequence of state changes (within the same A value) even though the update sequence number (U) values are not physically stored on the disk block when allocated/reallocated. This ultimately saves the expense in reading the block from disk to allocate/reallocate it (Problem 1 above). In that sense, the file and block allocation map 44, 57 counters ($A_f, A_g, A_h, A_i, A_j, A_k$ in the example of FIGS. 3A–3F) effectively act as generators of the prior art state identifier numbers.

Of further note, the state indicator vectors of the present invention prevents application of old transaction log records to new block allocation use. In the prior art, "old" log records were purged to guarantee no subsequent misapplication of old entries. With the present invention indications of V, A and U, there is no need for expensive purges of individual transaction log entries. This is because the log records will not be applied unless (i) the value of V' from a transaction log entry equals the V value of the disk block state indicator vector, (ii) the value of A' from a transaction log entry is greater than or equal to the A value of the disk block state indicator vector, and (iii) in the case of A'=A, the value of U' from a transaction log entry is greater than the U value of the disk block state indicator. Old log records will have a different (V,A,U) vector value than that of the current applicable log records.

For example, in FIGS. 3D and 3E, if there is a failure in the computer system after the time directory block s (which corresponds to disk block 56) is deallocated from metadata and reallocated to user data, the entries in T Log$_C$ corresponding to disk block 56 should not be applied to disk block 56 in an attempt to update it. Such an update (i.e., application of T Log$_C$ entries in FIG. 3E) would corrupt the user data currently in disk block 56. The present invention allocation sequence number A ensures that no such update occurs as follows.

As illustrated in FIGS. 3D and 3E during the user data stage of disk block 56, the state indicator vector in disk block 56 has been overwritten by user data. Thus, the block state indicator vector has some random value. As such, the update rule condition V'=V would not be met. To that end, the present invention file system 54 as illustrated in FIGS. 3D–3E solves previously described problem 2 of the prior art.

In sum, the present invention solves the three previously stated problems of the prior art by:

1. Resetting and assigning a block update sequence number equal to 1 upon allocation of a disk block to metadata, thereby avoiding reading the block from disk/memory storage (as illustrated and discussed above at least with regard to block 50 in FIG. 3E).
2. Providing a volume number V and an allocation sequence number A to distinguish between allocation stages of a block (i.e., from a first metadata allocation to a subsequent metadata or user data allocation), and thereby preventing "old" (past/prior metadata allocation states) transaction log entries from updating a current use of the disk block (as illustrated and discussed above at least with regard to block 56 and block 50 in FIGS. 3D–3F); and
3. Initializing a block state indicator (with V=the current volume, A=allocation map counter value and U=1) upon allocating a general pool block for metadata, thus avoiding writing the block to disk/memory storage for initialization (as partially illustrated and discussed above with regard to block 56 in FIG. 3F). The embodiment of FIG. 3G further addresses this problem and is discussed next.

Every block of memory storage 14 in the prior art needs to have a reliable, initial state identifier; without it, the first transaction log record cannot be applied. However, initializing a newly allocated block's state identifier and writing the block to disk before any transaction log record can be written, is a performance cost.

In another embodiment, the present invention eliminates the need to initialize blocks in the disk array 60 (FIGS. 3A–F) by modifying the above-discussed update rule to (V',A',U') updates (V,A,U) if and only if V'≠V and U'=0 or V'=V and A'>A or V'=V and A'=A and U'=(U+1) mod W; and by providing a wild-card state indicator. Preferably, a transaction log record with a block state indicator value of (V,A,0) defines a wild-card state indicator. As such, it has the capability to update any block 60 that has a random update sequence number (U).

Figure 3G:
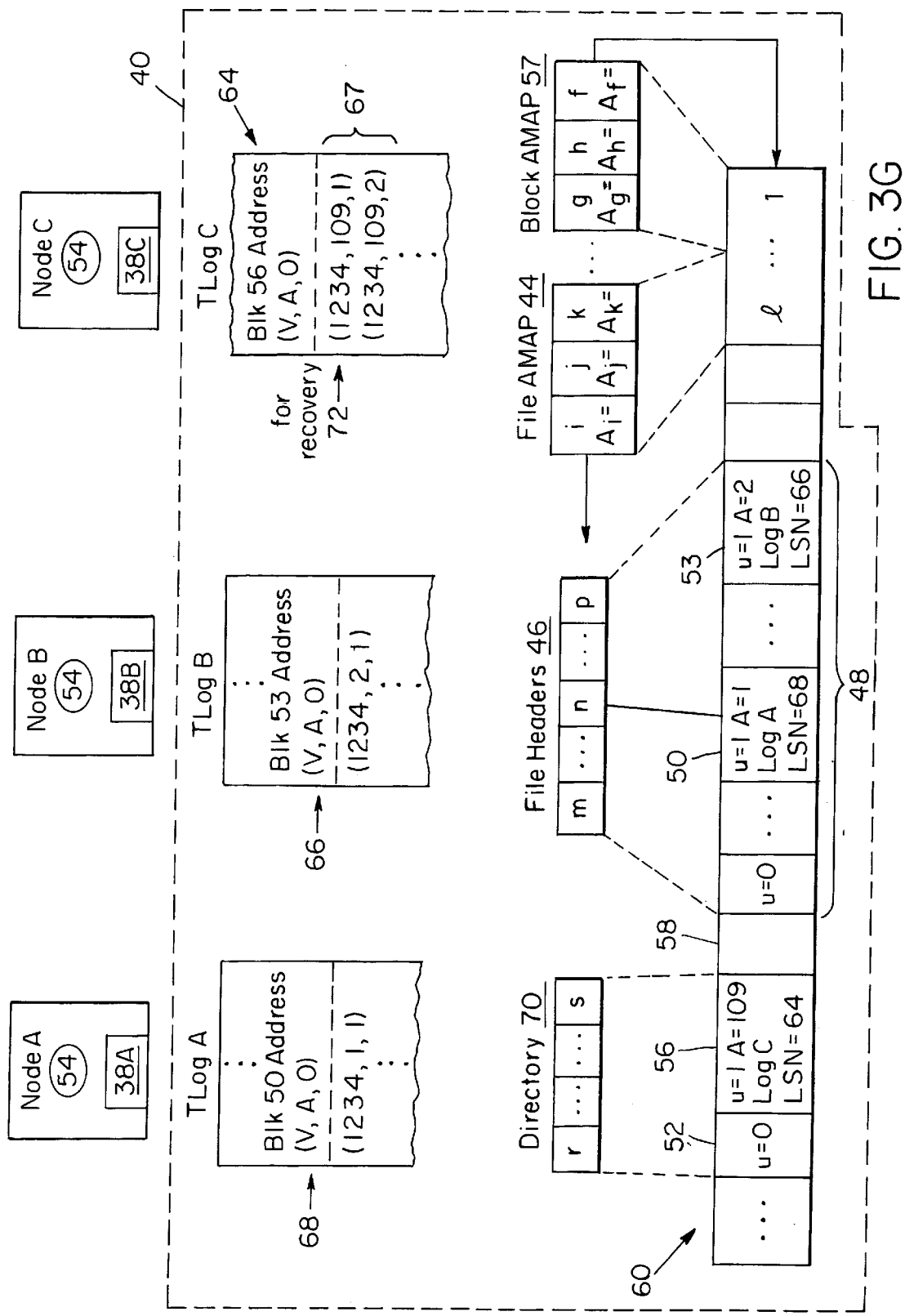
FIG. 3G is a schematic illustration of an alternative embodiment of the file system of FIGS. 3A–3F, which employs a wild-card state indicator.

The role of the wild-card state indicator is to allow a sequence of transaction log records to be applied to a block that has not been initialized with a valid state indicator such as block 56 in FIGS. 3E and F. Remember block 56 is deallocated from user data and subsequently allocated to metadata in FIGS. 3E and 3F. In that case, wild-card state indicator (V,A,0) is recorded before the sequence of transactions 67 starting with block state indicator (1234, 109, 1). Such is shown in $TLog_C$ of FIG. 3G and further discussed below. All other operation of file system 54 in FIG. 3G is as described above in the embodiment of FIGS. 3A–3F.

The foregoing wild-card state indicator, however, introduces a new problem as follows. A metadata block might be deallocated and subsequently reallocated for user data, while some transaction log still has a record (entry) for the block with a wild-card state indicator. On recovery, the user data would be updated from the transaction log, and hence corrupted. This is similar to prior stated Problem 2 above, except that the issue is for transaction log records with wild-card state indicators and not all transaction log records.

To eliminate this problem case, any transaction log record with a wild-card state indicator vector must be removed, before the block is potentially reallocated for user data. The typical method for removing transaction log records is to checkpoint the transaction log, specifying an end of a sequence of records by a so called LSN (log sequence number) of the last subject record. This effectively advances the start point for transaction log recovery to beyond the transaction log records (entries) with wild-card state indicators.

In the preferred embodiment, transaction logs A,B,C are implemented as respective circular buffers which wrap around. Throughout a given buffer (log), the respective log sequence number (LSN) increases for each log record written. Typically, the log sequence number is increased by the number of pages taken by the corresponding log record. A checkpoint record refers to or otherwise indicates the LSN of the current start point of the log. The checkpoint record is written to disk memory (persistent storage) 40 to indicate the starting point for reading from the log. Periodically the starting point/checkpoint record is advanced to exclude old log records. Thus, given the checkpoint record, the file system 54 is able to calculate the address of any log record given the LSN of the subject log record.

Accordingly, file system 54 adds an initial LSN to each metadata block 50,53,56 upon allocation of that block to metadata as illustrated in FIG. 3G (the parallel to FIG. 3C but in the alternative embodiment). That is, for each metadata block allocated, file system 54 records in the metadata block, (i) an indication of the transaction log that holds the first record (or entry) to update the block after the current allocation/reallocation to metadata, and (ii) the LSN of that record. The recorded indication specifically points out the transaction log records 64,66,68 with a wild-card state indicator vector (V,A,0). When such a metadata block 50,53, 56 is deallocated, the initial LSN is used to determine if a transaction log needs to be checkpointed to remove the wild-card record 64,66,68.

In the example of block 56 (directory 70, block s of the FIG. 3D embodiment), the alternative embodiment file system 54 deallocates block 56 in FIG. 3G and reads initial LSN=64 from block 56 in disk array 60. File system 54 refers to transaction log ($TLog_C$) record 64 (as indicated by "LogC" and LSN=64 in block 56) and determines whether the log has been checkpointed past LSN64 or not. If not, file system 54 advances the start point for recovery in corresponding $TLog_C$ to beyond record 64 as indicated at 72 in FIG. 3G.

It is noted that:

(i) Unless the block allocation is closely followed by its deallocation, the wild-card record will be deleted by the normal operation of logging long before the block is deallocated. This is illustrated by transactions logged/recorded at 67 in FIG. 3G. So most metadata deallocations will not require a checkpoint.

(ii) The transaction log to be checkpointed may be owned by a different computer node to that performing the block deallocation. In that case, the checkpoint request is sent to the appropriate computer node. This is accomplished by common/known interactions that occur between computer nodes A,B,C in a shared-disk system, and the details of which are in the purview of one skilled in the art.

There is a feature of this wild-card portion of the present invention file system that makes it preferable to use the file system 54 without a wild-card state indicator in some applications. If a malicious application could determine the volume identifier, then it could write high state indicator values in user data blocks, and then deallocate the blocks. If one of these blocks was subsequently used for metadata, and recovery became necessary, the file system would fail to apply any transaction log records to the block. This would leave the metadata block corrupt and with contents selected by the user.

One solution is to declare such malicious application activity (e.g., determining the volume identifier) a security violation for the computer system by means common in the art. Other solutions are suitable.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, the comparison of update sequence numbers may be U'>U instead of U'=(U+1) mod W as described above. In this case, an additional method must be used to allow operation to continue when U eventually overflows.

Further, volume identifier V is in a range of numbers outside of the acceptable range of numbers for application programs. This effectively isolates V from application programs.

The terms "failure in the computer system" and "computer system crash" and similar phraseology as used throughout the foregoing discussion refers to a variety of system failures such as I/O failures, file system 54 errors/failures, operating system errors and the like, in combination or singularly. The terminology is not limited to any one particular type of system failure or whole system shutdown, but rather expresses the state at which redo recovery is warranted. All such times that redo recovery is desired and/or needed are intended to be included.

In the preferred embodiment, recovery is performed in two cases. When one or more nodes fail which have the volume mounted, recovery is performed immediately by the surviving nodes. This could be done either by one of the surviving nodes processing all the transaction logs from the failed nodes, or by the surviving nodes sharing the transaction logs between them. If all nodes which have the volume mounted fail, recovery is performed by the first node to mount the volume when the node is restarted. That node also processes all the transaction logs on the volume. A failure is considered to be any situation where a node ceases to hold a volume mounted without performing the normal set of dismount operations (basically writing all cached updated blocks to their locations in PSTORE, and emptying the node's log). This can occur in various ways, typically:

The node halts because of an operating system failure.

The node halts because of a hardware failure.

The node suffers a power failure. Typically this will cause all the nodes in the cluster to fail.

The node is ejected from the cluster because of some (hardware) failure to communicate with other nodes, or (software) failure to operate the protocol needed to keep in the cluster.

The file system software on a node detects an internal (software) error and terminates itself, without halting the node.

Further, the allocation maps 44, 57 are described above as generating or otherwise providing the allocation sequence numbers for blocks of the storage memory. Counters are illustrated as serving the function of generating/providing the allocation sequence numbers. It is understood that other techniques for making allocation sequence numbers determinable from the allocation map 44, 57 are suitable.

What is claimed is:

1. In a computer system having a plurality of computer nodes sharing a storage memory formed of a plurality of blocks, a file system comprising:

an allocation map for indicating use of blocks in the storage memory;

a plurality of transaction logs, a different transaction log for each computer node, for recording a sequence of data transactions by the computer node on a block from the storage memory, each transaction log formed of a plurality of entries, a different entry for each data transaction of the respective computer node;

a block state indicator for each transaction log entry, the block state indicator being with respect to a subject block from the storage memory and providing an indication of allocation sequence of the block, the indication of allocation sequence being determinable from the allocation map such that upon the file system allocating usage of the subject block in response to a requesting computer node, the file system (a) sets indication of the allocation sequence in a manner free of initially reading the block from the storage memory, and (b) records the indication of allocation sequence in an entry of the transaction log of the requesting computer node, subsequent transactions on the subject block by the requesting node being recorded in respective entries in the transaction log, each respective entry reflecting state of the subject block by indicating in the block state indicator the allocation sequence; and recovery means for updating blocks in the storage memory upon a failure in the computer system, for each block being updated, the recovery means using one transaction log and the block state indicators recorded therein corresponding to the block in the storage memory.

2. A file system as claimed in claim 1 wherein the allocation map includes a file allocation map and a block allocation map, the file allocation map indicating use of metadata blocks.

3. A file system as claimed in claim 2 further comprising:

a first counter coupled to the transaction logs for determining an update sequence, the first counter increasing each time a computer node transaction on a subject block occurs, and increasing in order from one corresponding transaction log entry to a succeeding one; and a second counter coupled to the allocation map for determining the allocation sequence, the second counter incrementing each time a computer node of the computer system causes a block to be allocated, such that for the subject block, the transaction log entries recording requesting computer node transactions on the subject block indicate a same allocation sequence throughout the block state indicators of those transaction log entries while the corresponding update sequence indication is sequentially increased from a first one of said transaction log entries to succeeding ones.

4. In a computer system having a plurality of computer nodes sharing a storage memory formed of a plurality of blocks, a file system comprising:

an allocation map for indicating use of blocks in the storage memory;

a plurality of transaction logs, a different transaction log for each computer node, for recording a sequence of data transactions by the computer node on a block from the storage memory, each transaction log formed of a plurality of entries, a different entry for each data transaction of the respective computer node;

a block state indicator for each transaction log entry, the block state indicator being with respect to a subject block from the storage memory and providing an indication of allocation sequence of the block, the indication of allocation sequence being determinable from the allocation map such that upon the file system allocating usage of the subject block in response to a requesting computer node, the file system (a) sets indication of the allocation sequence in a manner free of initially reading the block from the storage memory, and (b) records the indication of allocation sequence in an entry of the transaction log of the requesting computer node, subsequent transactions on the subject block by the requesting node being recorded in respective entries in the transaction log, each respective entry reflecting state of the subject block by indicating in the block state indicator the allocation sequence;

a first counter coupled to the transaction logs for determining an update sequence, the first counter increasing each time a computer node transaction on a subject block occurs, and increasing in order from one corresponding transaction log entry to a succeeding one;

a second counter coupled to the allocation map for determining the allocation sequence, the second counter incrementing each time a computer node of the computer system causes a block to be allocated, such that for the subject block, the transaction log entries recording requesting computer node transactions on the subject block indicate a same allocation sequence throughout the block state indicators of those transaction log entries while the corresponding update sequence indication is sequentially increased from a first one of said transaction log entries to succeeding ones;

recovery means for updating blocks in the storage memory upon a failure in the computer system, for each block being updated, the recovery means using one transaction log and the block state indicators recorded therein corresponding to the block in the storage memory;

wherein the allocation map includes a file allocation map and a block allocation map, the file allocation map indicating use of metadata blocks, and wherein:
- the block state indicator provides an indication of (i) volume, (ii) the allocation sequence, and (iii) the update sequence of the block;
- the file system sets indications of volume, allocation sequence and update sequence on the subject block in the storage memory; and
- the recovery means updates a block in the storage memory according to a transaction log entry if [V'=V and A'>A] or [V'=V and A'=A and U'=(U+1) mod W] where
  - U' is the update sequence indication in the transaction log entry;
  - V' is the volume indication in the transaction log entry;
  - A' is the allocation sequence indication in the transaction log entry;
  - V is the volume indication of the block in the storage memory;
  - A is the allocation sequence indication in the block in the storage memory;
  - U is the update sequence indication of the block in the storage memory; and
  - W is word size in the computer system.

5. A file system as claimed in claim 4 wherein the term U'=(U+1) mod W is U'>U.

6. A file system as claimed in claim 5 further comprising a wild-card block state indicator enabling update of a block in storage memory having a random block state indicator, and wherein the recovery means further updates a block in the storage memory according to a transaction log entry if [V'≠V and U'=0] where

- V' is the volume indicator in the transaction log entry;
- U' is the update sequence indication in the transaction log entry; and
- V is the volume indication of the block being updated.

7. A file system as claimed in claim 4 further comprising a wild-card block state indicator enabling update of a block having a random block state indicator in storage memory, and wherein the recovery means updates a block in the storage memory according to a transaction log entry if [V'≠V and U'=0] where

- V' is the volume indicator in the transaction log entry;
- U' is the update sequence indication in the transaction log entry; and
- V is the volume indication of the block being updated.

8. A file system as claimed in claim 1 further comprising:
- a first counter coupled to the transaction logs for determining an update sequence, the first counter increasing each time a computer node transaction on a subject block occurs, and increasing in order from one corresponding transaction log entry to a succeeding one; and
- a second counter coupled to the allocation map for determining the allocation sequence, the second counter incrementing each time a computer node of the computer system causes a block to be allocated, such that for the subject block, the transaction log entries recording requesting computer node transactions on the subject block indicate a same allocation sequence throughout the block state indicators of those transaction log entries while the corresponding update sequence indication is sequentially increased from a first one of said transaction log entries to succeeding ones.

9. In a computer system having a plurality of computer nodes sharing a storage memory formed of a plurality of blocks, a file system comprising:

- an allocation map for indicating use of blocks in the storage memory;
- a plurality of transaction logs, a different transaction log for each computer node, for recording a sequence of data transactions by the computer node on a block from the storage memory, each transaction log formed of a plurality of entries, a different entry for each data transaction of the respective computer node;
- a block state indicator for each transaction log entry, the block state indicator being with respect to a subject block from the storage memory and providing an indication of allocation sequence of the block, the indication of allocation sequence being determinable from the allocation map such that upon the file system allocating usage of the subject block in response to a requesting computer node, the file system (a) sets indication of the allocation sequence in a manner free of initially reading the block from the storage memory, and (b) records the indication of allocation sequence in an entry of the transaction log of the requesting computer node, subsequent transactions on the subject block by the requesting node being recorded in respective entries in the transaction log, each respective entry reflecting state of the subject block by indicating in the block state indicator the allocation sequence;
- a first counter coupled to the transaction logs for determining an update sequence, the first counter increasing each time a computer node transaction on a subject block occurs, and increasing in order from one corresponding transaction log entry to a succeeding one;
- a second counter coupled to the allocation map for determining the allocation sequence, the second counter incrementing each time a computer node of the computer system causes a block to be allocated, such that for the subject block, the transaction log entries recording requesting computer node transactions on the subject block indicate a same allocation sequence throughout the block state indicators of those transaction log entries while the corresponding update sequence indication is sequentially increased from a first one of said transaction log entries to succeeding ones;
- recovery means for updating blocks in the storage memory upon a failure in the computer system, for each block being updated, the recovery means using one transaction log and the block state indicators recorded therein corresponding to the block in the storage memory; and wherein:
- the block state indicator provides an indication of (i) volume, (ii) the allocation sequence, and (iii) the update sequence of the block;
- the file system sets indications of volume, allocation sequence and update sequence on the subject block in the storage memory; and
- the recovery means updates a block in the storage memory according to a transaction log entry if [V'=V and A'>A] or [V'=V and A'=A and U'=(U+1) mod W] where U' is the update sequence indication in the transaction log entry;

V' is the volume indication in the transaction log entry;

A' is the allocation sequence indication in the transaction log entry;

V is the volume indication of the block in the storage memory;

A is the allocation sequence indication of the block in the storage memory;

U is the update sequence indication of the block in the storage memory; and

W is word size in the computer system.

10. A file system as claimed in claim 9 wherein the term U'=(U+1) mod W is U'>U.

11. A file system as claimed in claim 10 further comprising a wild-card block state indicator for enabling a certain transaction log entry to update any block in the storage memory, and wherein upon a failure in the computer system, the recovery means further updates a block in the storage memory according to the certain transaction log entry if V'≠V and U'=0 where V' is the volume indication of the certain transaction log entry;

U' is the update sequence indication in the certain transaction log entry; and

V is the volume indication of the block being updated.

12. A file system as claimed in claim 9 further comprising a wild-card block state indicator for enabling a certain transaction log entry to update any block in the storage memory, and wherein the recovery means further updates blocks in the storage memory according to the certain transaction log entry if V'≠V and U'=0 where V' is the volume indication of the certain transaction log entry;

U' is the update sequence indication in the certain transaction log entry; and

V is the volume indication of the block being updated.

13. In a computer system having a plurality of computer nodes sharing a storage memory, a method for allocating and updating blocks in the storage memory, the method comprising the steps of:

using an allocation map, indicating use of blocks in the storage memory;

providing a plurality of transaction logs, a different transaction log for each computer node, each transaction log formed of a plurality of entries;

recording in the transaction log of a computer node a sequence of data transactions, by the computer node on a block from the storage memory, for each different transaction, the transaction being recorded in a different entry of the transaction log;

indicating block state in each transaction log entry, the block state being with respect to a subject block from the storage memory, said indicating providing an indication of allocation sequence of the block;

upon allocation of the subject block in response to a requesting computer node, (a) determining from the allocation map the allocation sequence of the block, in a manner free of initially reading the block from the storage memory, and (b) recording the indication of allocation sequence in an entry of the transaction log of the requesting computer node and in the subject block in the storage memory;

in each of subsequent transactions on the subject block by the requesting node, recording the transaction in a respective entry in the transaction log including in each respective entry reflecting state of the subject block by indicating the allocation sequence of the block as recorded in the block in the storage memory; and updating blocks in the storage memory upon a failure in the computer system, for each block being updated, using one transaction log and the block state indications recorded therein corresponding to the block in the storage memory.

14. A method as claimed in claim 13 wherein the step of indicating use of blocks includes using a file allocation map and a block allocation map, the file allocation map indicating use of metadata blocks.

15. A method as claimed in claim 14 wherein the step of indicating block state includes (i) counting each time a computer node transaction occurs on a subject block, said counting providing an update sequence, and (ii) increasing the update sequence in order from one corresponding transaction log entry to a succeeding one; and the step of providing an indication of the allocation sequence includes counting each time a computer node of the computer system causes a block to be allocated, such that for the subject block, the transaction log entries recording requesting computer node transactions on the subject block indicate a same allocation sequence throughout the block state indications of those transaction log entries, while the corresponding update sequence indication is sequentially increased from a first one of said transaction log entries to succeeding ones.

16. In a computer system having a plurality of computer nodes sharing a storage memory, a method for allocating and updating blocks in the storage memory, the method comprising the steps of:

using an allocation map, indicating use of blocks in the storage memory;

providing a plurality of transaction logs, a different transaction log for each computer node, each transaction log formed of a plurality of entries;

recording in the transaction log of a computer node a sequence of data transactions, by the computer node on a block from the storage memory, for each different transaction, the transaction being recorded in a different entry of the transaction log;

indicating block state in each transaction log entry, the block state being with respect to a subject block from the storage memory, said indicating providing an indication of allocation sequence of the block;

upon allocation of the subject block in response to a requesting computer node, (a) determining from the allocation map the allocation sequence of the block, in a manner free of initially reading the block from the storage memory, and (b) recording the indication of allocation sequence in an entry of the transaction log of the requesting computer node and in the subject block in the storage memory;

in each of subsequent transactions on the subject block by the requesting node, recording the transaction in a respective entry in the transaction log including in each respective entry reflecting state of the subject block by indicating the allocation sequence of the block as recorded in the block in the storage memory; and updating blocks in the storage memory upon a failure in the computer system, for each block being updated, using one transaction log and the block state indications recorded therein corresponding to the block in the storage memory;

wherein the step of indicating use of blocks includes using a file allocation map and a block allocation map, the file allocation map indicating use of metadata blocks, and wherein the step of indicating block state includes (i) counting each time a computer node transaction occurs on a subject block, said counting providing an update sequence, and (ii) increasing the update sequence in order from one corresponding transaction log entry to a succeeding one;

wherein the step of providing an indication of the allocation sequence includes counting each time a computer node of the computer system causes a block to be allocated, such that for the subject block, the transaction log entries recording requesting computer node transactions on the subject block indicate a same allocation sequence throughout the block state indications of those transaction log entries, while the corresponding update sequence indication is sequentially increased from a first one of said transaction log entries to succeeding ones; and wherein:
the step of indicating block state includes providing an indication of (i) volume, (ii) the allocation sequence and (iii) the update sequence of the block;
further setting indication of volume and update sequence on the subject block in the storage memory upon allocation of the subject block; and
the step of updating blocks using one transaction log per block being updated includes:
comparing volume indication in the transaction log entry to volume indication of a subject block in the storage memory;
comparing allocation sequence indication in the transaction entry to allocation sequence stored in the subject block in the storage memory; and
comparing update sequence indication in the transaction log entry to update sequence indication of the block in the storage memory.

17. A method as claimed in claim 16 wherein said steps of comparing include updating the subject block with a certain transaction log if and only if $V'=V$ and $A'>A$; or $V'=V$ and $A'=A$ and $U'=(U+1) \mod W$ where
U' is the update sequence indication in the transaction log entry;
V' is the volume indication in the transaction log entry;
A' is the allocation sequence indication in the transaction log entry;
V is the volume indication of the block in the storage memory;
A is the allocation sequence indication in the block in the storage memory;
U is the update sequence indication of the block in the storage memory; and
W is computer word size.

18. A method as claimed in claim 17 further comprising the step of indicating a wild-card block state indicator in a certain transaction log entry, to enable the certain transaction log entry to update any block in the storage memory; and wherein, the steps of comparing further include updating the subject block with the certain transaction log entry if $V' \neq V$ and $U'=0$ where V' is the volume indication of the certain transaction log entry;
U' is the update sequence indication in the certain transaction log entry; and
V is the volume indication of the block being updated.

19. A method as claimed in claim 13 wherein the step of indicating block state includes (i) counting each time a computer node transaction occurs on a subject block, said counting providing an update sequence, and (ii) increasing the update sequence in order from one corresponding transaction log entry to a succeeding one; and the step of providing an indication of the allocation sequence includes counting each time a computer node of the computer system causes a block to be allocated, such that for the subject block, the transaction log entries recording requesting computer node transactions on the subject block indicate a same allocation sequence throughout the block state indications of those transaction log entries while the corresponding update sequence indication is sequentially increased from a first one of said transaction log entries to succeeding ones.

20. In a computer system having a plurality of computer nodes sharing a storage memory, a method for allocating and updating blocks in the storage memory, the method comprising the steps of:

using an allocation map, indicating use of blocks in the storage memory;

providing a plurality of transaction logs, a different transaction log for each computer node, each transaction log formed of a plurality of entries;

recording in the transaction log of a computer node a sequence of data transactions, by the computer node on a block from the storage memory, for each different transaction, the transaction being recorded in a different entry of the transaction log;

indicating block state in each transaction log entry, the block state being with respect to a subject block from the storage memory, said indicating providing an indication of allocation sequence of the block;

upon allocation of the subject block in response to a requesting computer node, (a) determining from the allocation map the allocation sequence of the block, in a manner free of initially reading the block from the storage memory, and (b) recording the indication of allocation sequence in an entry of the transaction log of the requesting computer node and in the subject block in the storage memory;

in each of subsequent transactions on the subject block by the requesting node, recording the transaction in a respective entry in the transaction log including in each respective entry reflecting state of the subject block by indicating the allocation sequence of the block as recorded in the block in the storage memory;

updating blocks in the storage memory upon a failure in the computer system, for each block being updated, using one transaction log and the block state indications recorded therein corresponding to the block in the storage memory;

wherein the step of indicating block state includes (i) counting each time a computer node transaction occurs on a subject block, said counting providing an update sequence, and (ii) increasing the update sequence in order from one corresponding transaction log entry to a succeeding one;

the step of providing an indication of the allocation sequence includes counting each time a computer node of the computer system causes a block to be allocated, such that for the subject block, the transaction log entries recording requesting computer node transactions on the subject block indicate a same allocation sequence throughout the block state indications of those transaction log entries while the corresponding update sequence indication is sequentially increased from a first one of said transaction log entries to succeeding ones; and wherein:
the step of indicating block state includes providing an indication of (i) volume, (ii) the allocation sequence and (iii) the update sequence of the block;
further setting indication of volume and update sequence on the subject block in the storage memory upon allocation of the subject block; and
the step of updating blocks using one transaction log per block being updated includes:
comparing volume indication in the transaction log entry to volume indication of a subject block in the storage memory;
comparing allocation sequence indication in the transaction entry to allocation sequence stored in the subject block in the storage memory; and
comparing update sequence indication in the transaction log entry to update sequence indication of the block in the storage memory.

21. A method as claimed in claim 20 wherein said steps of comparing include updating the subject block with a certain transaction log if and only if $V'=V$ and $A'>A$; or
$V'=V$ and $A'=A$ and $U'=(U+1) \bmod W$
where
U' is the update sequence indication in the transaction log entry;
V' is the volume indication in the transaction log entry;
A' is the allocation sequence indication in the transaction log entry;
V is the volume indication of the block in the storage memory;
A is the allocation sequence indication in the block in the storage memory;
U is the update sequence indication of the block in the storage memory; and
W is computer word size.

22. A method as claimed in claim 21 further comprising the step of indicating a wild-card block state indicator in a certain transaction log entry, to enable the certain transaction log entry to update any block in the storage memory; and
wherein, the steps of comparing further include updating the subject block with the certain transaction log entry if $V'\neq V$ and $U'=0$ where
V' is the volume indication of the certain transaction log entry;
U' is the update sequence indication in the certain transaction log entry; and
V is the volume indication of the block being updated.

23. A method as claimed in claim 22 further comprising the step of:
upon deallocation of a block, effectively removing the certain transaction log entry having the wild-card block state indicator and corresponding to the newly deallocated block, such that the certain transaction log entry is omitted from updating blocks in the storage memory.

24. A computer readable medium encoding a digital processor routine for implementing a shared memory file system with memory block allocation and multiple redo update of memory blocks, the processor routine comprising:
allocation map means for indicating use of blocks on the shared memory;
a plurality of transaction logs, a different transaction log for each computer node, for recording a sequence of data transactions by the computer node on a block from a storage memory, each transaction log formed of a plurality of entries, a different entry for each data transaction of the respective computer node;
a block state indicator for each transaction log entry, the block state indicator being with respect to a subject block from the storage memory and providing an indication of at least allocation sequence of the block, the indication of allocation sequence being provided by the allocation map such that upon the file system allocating usage of the subject block in response to a requesting computer node, the file system (a) sets indication of the allocation sequence in the allocation map in a manner free of initially reading the block from the storage memory, and (b) records the indication of allocation sequence in an entry of the transaction log of the requesting computer node, subsequent transactions on the subject block by the requesting node being recorded in respective entries in the transaction log, each respective entry reflecting state of the subject block by indicating in the block state indicator at least the allocation sequence; and
recovery means for updating blocks in the storage memory upon a failure in the computer system, for each block being updated, the recovery means using one transaction log and the block state indicators recorded therein corresponding to the block in the storage memory.

25. A computer readable medium encoding a digital processor routine for implementing a shared memory file system with memory block allocation and multiple redo update of memory blocks, the processor routine comprising:
allocation map means for indicating use of blocks on the shared memory;
a plurality of transaction logs, a different transaction log for each computer node, for recording a sequence of data transactions by the computer node on a block from a storage memory, each transaction log formed of a plurality of entries, a different entry for each data transaction of the respective computer node;
a block state indicator for each transaction log entry, the block state indicator being with respect to a subject block from the storage memory and providing an indication of at least allocation sequence of the block, the indication of allocation sequence being provided by the allocation map such that upon the file system allocating usage of the subject block in response to a requesting computer node, the file system (a) sets indication of the allocation sequence in the allocation map in a manner free of initially reading the block from the storage memory, and (b) records the indication of allocation sequence in an entry of the transaction log of the requesting computer node, subsequent transactions on the subject block by the requesting node being recorded in respective entries in the transaction log, each respective entry reflecting state of the subject block by indicating in the block state indicator at least the allocation sequence;

recovery means for updating blocks in the storage memory upon a failure in the computer system, for each block being updated, the recovery means using one transaction log and the block state indicators recorded therein corresponding to the block in the storage memory; and wherein:
  the block state indicator provides an indication of (i) volume, (ii) allocation sequence and (iii) update sequence of the block;
  the file system sets indications of volume, allocation sequence and update sequence on the subject block in the storage memory; and
  the recovery means updates a block in the storage memory according to a transaction log entry if [V'=V and A'>A] or [V'=V and A'=A and U'=(U+1) mod W] where
    U' is the update sequence indication in the transaction log entry;
    V' is the volume indication in the transaction log entry;
    A' is the allocation sequence indication in the transaction log entry;
    V is the volume indication of the block in the storage memory;
    A is the allocation sequence indication in the block in the storage memory;
    U is the update sequence indication of the block in the storage memory; and
    W is word size in the computer system.

26. The processor routine of claim 25 further comprising a wild-card block state indicator for enabling a certain transaction log entry to update any block in the storage memory, and wherein upon a failure in the computer system, the recovery means further updates a block in the storage memory according to the certain transaction log entry if V'≠V and U'=0 where
  V' is the volume indication of the certain transaction log entry;
  U' is the update sequence indication in the certain transaction log entry; and
  V is the volume indication of the block being updated.

27. The processor routine of claim 26 further comprising a removal subroutine for, upon deallocation of a block, effectively removing the certain transaction log entry having the wild-card block state indicator and corresponding to the block, such that the certain transaction log entry is omitted from updating blocks in the storage memory.

* * * * *